United States Patent [19]
Iida

[11] Patent Number: 5,347,208
[45] Date of Patent: Sep. 13, 1994

[54] CHARGING EQUIPMENT FOR CHARGING A PORTABLE APPARATUS AND SEPARABLE CELL PACK

[75] Inventor: Shinobu Iida, Tokyo, Japan

[73] Assignee: Matsushita Electric Industrial Co., Ltd., Osaka, Japan

[21] Appl. No.: 66,216

[22] Filed: May 25, 1993

[30] Foreign Application Priority Data

May 26, 1992 [JP] Japan .................................. 4-133242

[51] Int. Cl.⁵ .............................................. H02J 7/00
[52] U.S. Cl. .......................................... 320/2; 455/90
[58] Field of Search ........................ 320/2; 455/89, 90

[56] References Cited

U.S. PATENT DOCUMENTS

| | | | |
|---|---|---|---|
| 4,558,270 | 12/1985 | Liautaud et al. | 320/2 |
| 5,046,131 | 9/1991 | Takahashi et al. | 455/90 |
| 5,052,943 | 10/1991 | Davis | 320/2 X |
| 5,136,229 | 8/1992 | Galvin | 320/2 |
| 5,229,701 | 7/1993 | Leman et al. | 320/2 |

Primary Examiner—Kristine L. Peckman
Attorney, Agent, or Firm—Mason, Fenwick & Lawrence

[57] ABSTRACT

Charging equipment includes a portable apparatus charging portion for receiving a portable apparatus containing a cell pack to be charged, and a simple cell pack charging portion for receiving a simple cell pack separated from the portable apparatus and charging the same. The charging equipment is able to charge not only a portable charging apparatus containing a cell pack, but also a simple separable cell pack.

1 Claim, 3 Drawing Sheets

CHARGING EQUIPMENT FOR CHARGING A PORTABLE APPARATUS AND SEPARABLE CELL PACK

BACKGROUND OF THE INVENTION

The present invention relates to charging equipment used for a portable apparatus containing an electric cell pack such as a cordless telephone.

For example, when a cordless telephone 10 containing, as shown in FIG. 4, a separable secondary cell pack 10 is to be charged, the telephone 3 containing the cell pack 10 is moved in a direction indicated in FIG. 4 with an arrow and received in a charging portion 2 of the charging equipment 1, whereby the cordless telephone 3 is received in the charging portion 2 and the cell pack in the cordless telephone is electrically charged.

SUMMARY OF THE INVENTION

However, although a conventional charging equipment, such as discussed above, is able to achieve an electric charging when the portable apparatus body itself equipped with an electric cell pack to be charged is positioned in the charging portion of the charging equipment, it is impossible to charge a simple spare cell pack separated from the portable apparatus body.

The object of the present invention is to provide charging equipment which is capable of charging not only a cell pack situated in a portable apparatus to be charged, but also a simple spare cell pack separated from the apparatus body.

For achieving the above-mentioned object of the present invention, charging equipment according to the present invention is characterized in that the charging equipment has a portable apparatus charging portion adapted to receive the portable apparatus as a whole for charging the cell pack contained in the portable apparatus, as well as a simple cell pack charging portion adapted to receive the simple cell pack for charging the simple cell pack separated from the portable apparatus body.

PREFERRED EMBODIMENT OF THE INVENTION

Figure 1:
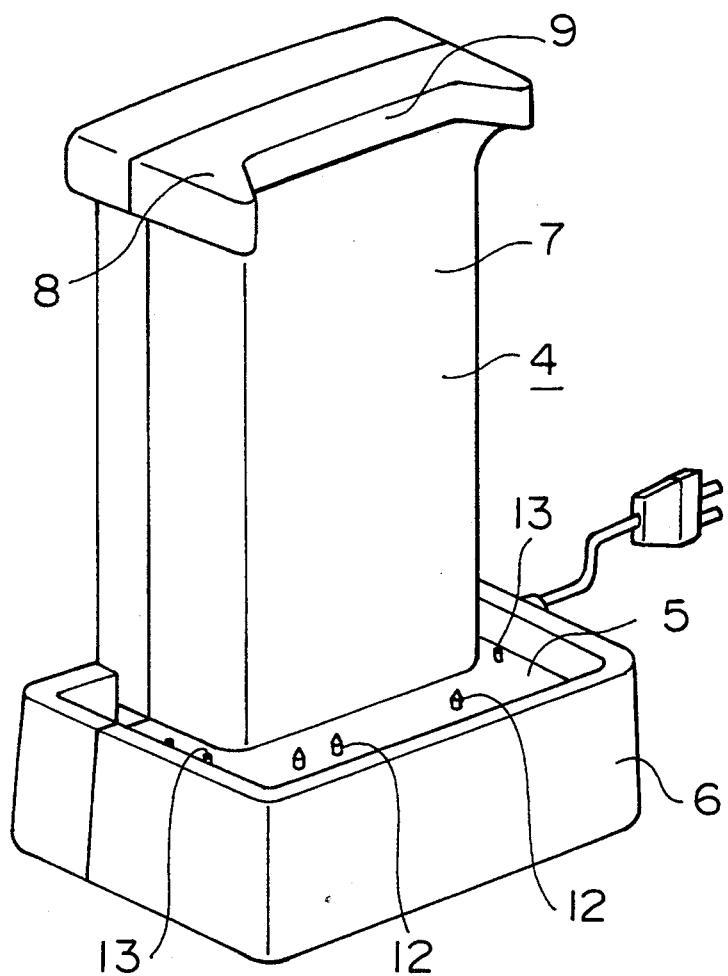
FIG. 1 is a perspective view of charging equipment according to the present invention.

Now the present invention will be described by referring to an embodiment which is used for charging a cordless telephone. Charging equipment 4 according to the present invention comprises a charging base portion 6 formed with a substantially U-shaped recess portion 5 and a square pillar portion 7 projecting upwards from and perpendicularly to the recess portion 5, and the square pillar portion 7 is formed at the upper portion thereof with a flange 8 having a cut-out 9 at the front portion thereof.

Figure 2:
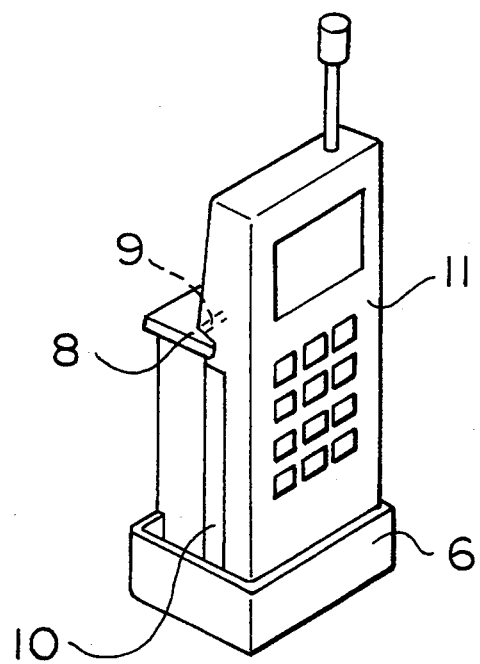
FIG. 2 is a perspective view of charging equipment according to the present invention illustrating mounting of a cordless telephone containing a cell pack.
Figure 3:
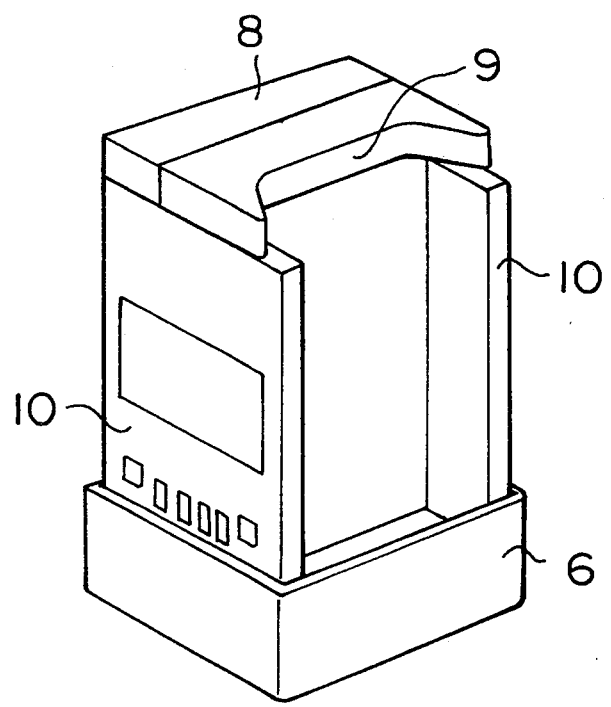
FIG. 3 is a perspective view of a charging equipment according to the present invention mounting a simple cell pack separated from the portable apparatus body.
Figure 4:
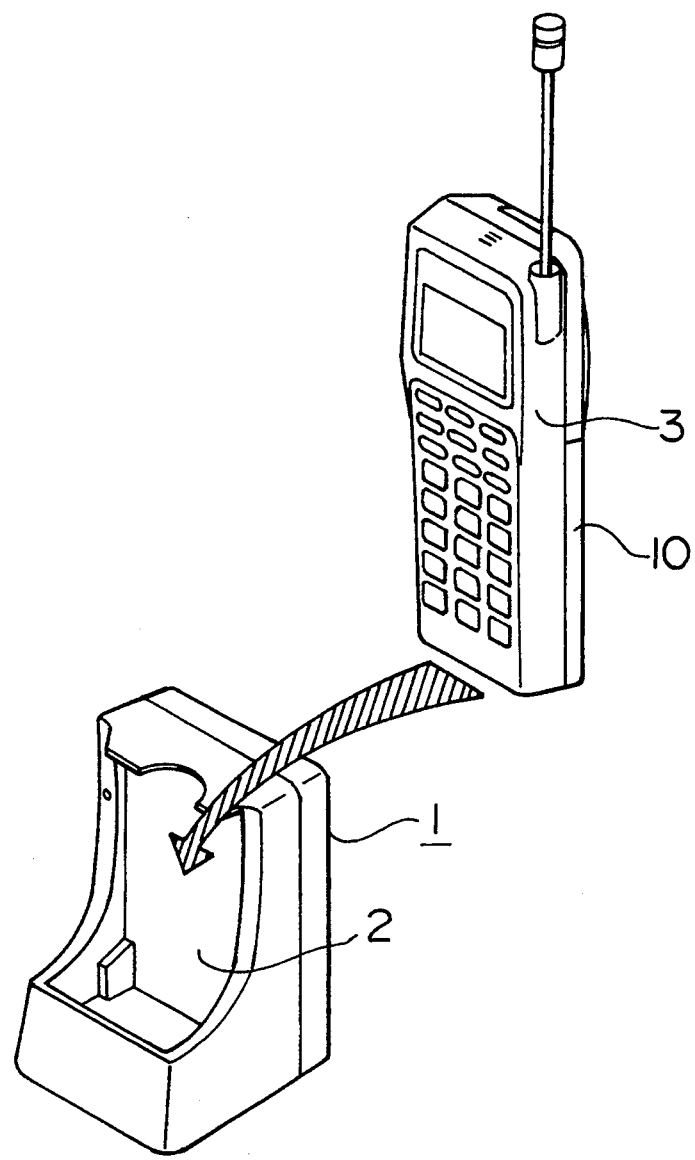
FIG. 4 is a combination of a perspective view of a cordless telephone containing a secondary cell pack and a perspective view of conventional charging equipment.

Practically, when a cordless telephone containing a secondary cell pack 10 or a simple secondary cell pack 10 separated from the telephone body is to be charged, the cordless telephone 11 containing the secondary cell pack 10 or the simple secondary cell pack 10 is mounted on the recess portion 5 of the charging base portion 6 as shown in FIG. 2 and in FIG. 3, respectively.

In detail, the cordless telephone charging portion is constituted by the cut-out portion 9 formed at the front portion of the flange 8, the front portion of the square pillar portion 7 and the front portion of the charging base portion 6.

The cell pack charging portion is constituted by the left and right side portions of the flange 8, the left and right side surfaces of square pillar portion 7 and the left and right portions of the charging base portion 6. In the recess portion 5 of the charging base portion 6 are arranged charging terminals 12 for the cordless telephone and charging terminals 13 for the secondary cell pack.

In consequence, when a cordless telephone 11 containing a secondary cell pack 10 is intended to be charged, the cordless telephone 11 is disposed, as shown in FIG. 2, against the cut-out portion 9, the front portion of the square pillar portion 7 and the front portion of the charging base portion 6, whereby the bottoms of the secondary pack 10 and the cordless telephone body 11 are received in the recess portion 5 of the charging base portion 6 with the terminals of the secondary cell pack 10 contacting with the charging terminals 12 not shown.

On the other hand, when a simple secondary cell pack 10 is intended to be charged, the secondary pack 10 is disposed, as shown in FIG. 3, below the left and right portions of the flange 8, whereby the bottom of the secondary cell pack is received in the recess portion 5 of the charging base portion 6 with the terminals of the secondary cell pack 10 contacting with the charging terminals 13 not shown, and a charging operation is started.

What is claimed is:

1. Charging equipment for charging a portable apparatus containing a separable cell pack therein, comprising:
    a portable apparatus charging portion which receives said portable apparatus containing the separable cell pack for charging said cell pack, said portable apparatus charging portion including a simple cell pack charging portion to receive said cell pack separated from said apparatus for charging said cell pack,
    a charging base portion formed with a U-shaped recess portion for receiving said apparatus containing the cell pack or said cell pack separated from said apparatus, and
    a square pillar portion projecting upwards from and perpendicularly to said recess portion and formed with a flange at an upper portion of the pillar portion,
    said flange, said square pillar portion and said charging base portion constituting said portable apparatus charging portion and said simple cell pack charging portion.

* * * * *